(12) United States Patent
Shen et al.

(10) Patent No.: US 11,305,946 B2
(45) Date of Patent: Apr. 19, 2022

(54) DRIVE SYSTEM OF SCRAPER CONVEYOR AND CONTROL METHOD

(71) Applicants: China University of Mining and Technology, Jiangsu (CN); JIANGSU TIANMING MACHINERY GROUP CO., LTD., Jiangsu (CN)

(72) Inventors: Gang Shen, Jiangsu (CN); Zhencai Zhu, Jiangsu (CN); Kaiyu Dai, Jiangsu (CN); Yu Tang, Jiangsu (CN); Xiang Li, Jiangsu (CN); Yuxing Peng, Jiangsu (CN); Hao Lu, Jiangsu (CN); Guohua Cao, Jiangsu (CN); Gongbo Zhou, Jiangsu (CN); Wei Li, Jiangsu (CN); Fan Jiang, Jiangsu (CN)

(73) Assignees: China University of Mining and Technology, Jiangsu (CN); JIANGSU TIANMING MACHINERY GROUP CO., LTD., Jiangsu (CN)

(*) Notice: Subject to any disclaimer, the term of this patent is extended or adjusted under 35 U.S.C. 154(b) by 0 days.

(21) Appl. No.: 17/266,628

(22) PCT Filed: Apr. 10, 2020

(86) PCT No.: PCT/CN2020/084227
§ 371 (c)(1),
(2) Date: Feb. 8, 2021

(87) PCT Pub. No.: WO2021/103380
PCT Pub. Date: Jun. 3, 2021

(65) Prior Publication Data
US 2022/0063927 A1    Mar. 3, 2022

(30) Foreign Application Priority Data
Nov. 26, 2019 (CN) .......................... 201911172333.1

(51) Int. Cl.
*B65G 43/10* (2006.01)
*B65G 19/18* (2006.01)
(Continued)

(52) U.S. Cl.
CPC ............. *B65G 43/10* (2013.01); *B65G 19/18* (2013.01); *B65G 23/22* (2013.01); *B65G 23/26* (2013.01);
(Continued)

(58) Field of Classification Search
CPC ........ B65G 43/10; B65G 19/18; B65G 23/22; B65G 23/26; B65G 23/44;
(Continued)

(56) References Cited

U.S. PATENT DOCUMENTS

2012/0090308 A1* 4/2012 Yuan ...................... F15B 13/044
60/327
2015/0322784 A1* 11/2015 Liu ......................... E21C 27/12
299/10
(Continued)

FOREIGN PATENT DOCUMENTS

| CN | 203855097 | 10/2014 |
|---|---|---|
| CN | 204197849 | 3/2015 |

(Continued)

OTHER PUBLICATIONS

"International Search Report (Form PCT/ISA/210)" of PCT/CN2020/084227, dated Aug. 18, 2020, pp. 1-5.
(Continued)

*Primary Examiner* — James R Bidwell
(74) *Attorney, Agent, or Firm* — JCIPRNET

(57) ABSTRACT

The present invention discloses a drive system of a scraper conveyor and a control method. The drive system includes a nose sprocket, a tail sprocket, a nose sprocket drive mechanism, and a tail sprocket drive mechanism, where the
(Continued)

nose sprocket drive mechanism is a hydraulic motor I, and the tail sprocket drive mechanism is a hydraulic motor II; and a hydraulic system that drives the hydraulic motor I and a hydraulic system that drives the hydraulic motor II include same hydraulic elements, and both include a three-position four-way solenoid directional valve, a two-position two-way solenoid directional valve, a two-position three-way solenoid directional valve, an accumulator, and an oil supplement valve group. The present invention is applicable to rapid starting and stopping of the scraper conveyor in a heavy load status while adjusting chain tension in real time, thereby resolving a power imbalance problem in a dual-drive system, and has a simple structure and a long service life.

10 Claims, 4 Drawing Sheets

(51) Int. Cl.
*B65G 23/44* (2006.01)
*B65G 23/26* (2006.01)
*B65G 23/22* (2006.01)
*F15B 1/04* (2006.01)
*F15B 13/044* (2006.01)

(52) U.S. Cl.
CPC ............... *B65G 23/44* (2013.01); *F15B 1/04* (2013.01); *F15B 13/044* (2013.01); *B65G 2203/0266* (2013.01); *B65G 2203/0291* (2013.01); *B65G 2203/042* (2013.01); *F15B 2013/0448* (2013.01)

(58) Field of Classification Search
CPC ............ B65G 2203/0266; B65G 43/02; B65G 43/00; B65G 2203/042; B65G 2203/0291; F15B 1/04; F15B 13/044
USPC .................................................. 198/728–734
See application file for complete search history.

(56) References Cited

U.S. PATENT DOCUMENTS

| | | | | |
|---|---|---|---|---|
| 2016/0107840 A1* | 4/2016 | DeGroot | ................ | B65G 23/26 |
| | | | | 198/617 |
| 2017/0241445 A1* | 8/2017 | Shang | ........................ | F15B 1/04 |
| 2019/0367288 A1* | 12/2019 | Papsdorf | ................ | B65G 43/10 |

FOREIGN PATENT DOCUMENTS

| | | | | | |
|---|---|---|---|---|---|
| CN | 207001537 | | 2/2018 | | |
| CN | 109110383 | * | 10/2018 | ............ | B65G 15/22 |
| CN | 109677842 | * | 1/2019 | ............ | B65G 19/18 |
| CN | 110092140 | * | 5/2019 | ............ | B65G 23/22 |
| CN | 110817343 | | 2/2020 | | |
| GB | 2089756 | * | 6/1982 | ............ | B65G 19/22 |
| JP | 2016135713 | | 7/2016 | | |

OTHER PUBLICATIONS

"Written Opinion of the International Searching Authority (Form PCT/ISA/237)" of PCT/CN2020/084227, dated Aug. 18, 2020, with English translation thereof, pp. 1-8.

* cited by examiner

DRIVE SYSTEM OF SCRAPER CONVEYOR AND CONTROL METHOD

CROSS-REFERENCE TO RELATED APPLICATION

This application is a 371 of international application of PCT application serial no. PCT/CN2020/084227, filed on Apr. 10, 2020, which claims the priority benefit of China application no. 201911172333.1, filed on Nov. 26, 2019. The entirety of each of the above mentioned patent applications is hereby incorporated by reference herein and made a part of this specification.

TECHNICAL FIELD

The present invention relates to the field of underground material conveying technologies, and in particular, to a drive system of a scraper convey and a control method.

DESCRIPTION OF RELATED ART

A scraper conveyor is a continuous conveying machine, has advantages such as a large conveying capacity, a wide applicable environment, and simple maintenance, and is widely applied to fully mechanized coal mining faces. A traction drive system of a conventional scraper conveyor mainly includes apparatuses such as a drive motor, a reducer, a soft starter, and a sprocket. A drive mechanism including the drive motor and the reducer is used to drive the sprocket to rotate, and the soft starter is used to start or turn off the drive motor.

However, the traction drive system of the foregoing scraper conveyor has the following defects: I. A high-power scraper conveyor usually uses two drive systems to drive a nose sprocket and a tail sprocket respectively to increase a driving force, but a dual-drive system often has power imbalances. II. In a process in which the scraper conveyor conveys materials, chain tension is too large or too small due to reasons such as a load change, and tension adjustment manners of most existing scraper conveyors are a passive adjustment method during downtime, resulting in an impact on working efficiency. III. If the drive system is rapidly started or stopped when the scraper conveyor is in a heavy load status, torque suddenly changes, resulting in relatively large shakes, which further affect a service life of a scraper.

SUMMARY

To overcome shortcomings in the prior art, the present invention provides a drive system of a scraper conveyor and a control method, is applicable to rapid starting and stopping of the scraper conveyor in a heavy load status while adjusting chain tension in real time, thereby resolving a power imbalance problem in a dual-drive system, and has a simple structure and a long service life.

To achieve the foregoing objective, the present invention provides a drive system of a scraper conveyor, including: a nose sprocket, a tail sprocket, a nose sprocket drive mechanism, and a tail sprocket drive mechanism, where the nose sprocket drive mechanism is a hydraulic motor I, and the tail sprocket drive mechanism is a hydraulic motor II; and a hydraulic system that drives the hydraulic motor I and a hydraulic system that drives the hydraulic motor II include same hydraulic elements;

the hydraulic system that drives the hydraulic motor I and the hydraulic system that drives the hydraulic motor II both include: a three-position four-way solenoid directional valve, a two-position two-way solenoid directional valve, a two-position three-way solenoid directional valve, an accumulator, and an oil supplement valve group; an oil inlet P of the three-position four-way solenoid directional valve is in communication with a hydraulic oil source, a first actuator port of the three-position four-way solenoid directional valve is in communication with an oil inlet of the hydraulic motor I, a second actuator port of the three-position four-way solenoid directional valve is in communication with an oil inlet of the two-position two-way solenoid directional valve and an oil return port of the hydraulic motor I separately, an oil outlet of the two-position two-way solenoid directional valve is in communication with a P-port of the two-position three-way solenoid directional valve through an one-way valve I, an A-port of the two-position three-way solenoid directional valve is connected to the accumulator, a T-port of the two-position three-way solenoid directional valve is in communication with the oil inlet of the hydraulic motor I through an one-way valve II, and the oil supplement valve group is connected to an oil circuit between the oil inlet and the oil return port of the hydraulic motor I in parallel.

Further, the hydraulic motor I and the hydraulic motor II are both servo-variable hydraulic motors; and the drive system further includes a controller, where the controller includes a start-stop controller, and the start-stop controller controls starting and stopping of the hydraulic motor I and the hydraulic motor II by controlling actions of hydraulic elements in a hydraulic valve group.

Further, the oil supplement valve group includes two one-way valves connected in series, an oil outlet of an one-way valve III is in communication with the oil return port of the hydraulic motor I, an oil inlet of the one-way valve III is in communication with an oil tank, an oil inlet of an one-way valve IV is in communication with the oil tank, and an oil outlet of the one-way valve IV is in communication with the oil inlet of the hydraulic motor I.

Further, the controller includes a speed synchronization controller, rotational speed torque sensors disposed respectively between the hydraulic motor I and the nose sprocket and between the hydraulic motor and the tail sprocket, and the speed synchronization controller controls, according to rotational speed signals of the rotational speed torque sensors, the nose sprocket and the tail sprocket to synchronously rotate.

Further, the controller further includes a tension coordination controller, a chain tension monitoring sensor is disposed on a scraper of the scraper conveyor, and the tension coordination controller controls and adjusts tension of a chain according to chain tension detected by the chain tension monitoring sensor.

A control method for a drive system of a scraper conveyor is provided, including the following steps:

step 1: switching, by a start-stop controller in a controller, to a start mode, and controlling, by the start-stop controller, actions of solenoid valves in a hydraulic valve group, to supply hydraulic oil in a hydraulic oil source and high-pressure oil stored in an accumulator to a hydraulic motor I and a hydraulic motor II at the same time, and gradually reduce swash plate inclination angles of the hydraulic motor I and the hydraulic motor II from the maximum until the scraper conveyor reaches a rated operating rotational speed;

step 2: in a coal conveying process of the scraper conveyor, sending, by rotational speed torque sensors, real-time rotational speeds and average rotational speeds of the hydraulic motor I and the hydraulic motor II respectively to a speed synchronization controller, and controlling, by the synchronization controller, the swash plate inclination angles of the hydraulic motor I and the hydraulic motor II respectively according to a preset relative error value and an expected rotational speed value, to keep a tail sprocket and a nose sprocket synchronously rotating, to maintain a stable operating speed of the scraper conveyor;

step 3: when a chain tension monitoring sensor detects that chain tension is lower than a preset minimum tension value, switching, by the controller, to a tension coordination controller in real time, controlling, by the tension coordination controller, the swash plate inclination angle of the hydraulic motor II at a tail to increase, to reduce a rotational speed of the tail sprocket and keep a rotational speed of the nose sprocket unchanged, thereby gradually increasing the chain tension until the chain tension falls within a preset value range, and switching, by the controller, to the synchronization controller in real time, to keep the tail sprocket and the nose sprocket synchronously rotating;

step 4: when the chain tension monitoring sensor detects that the chain tension is higher than a preset maximum tension value, switching, by the controller, to the tension coordination controller in real time, controlling, by the tension coordination controller, the swash plate inclination angle of the hydraulic motor II at the tail to decrease, to increase the rotational speed of the tail sprocket and keep the rotational speed of the nose sprocket unchanged, thereby gradually reducing the chain tension until the chain tension falls within the preset value range, and switching, by the controller, to the synchronization controller in real time, to keep the tail sprocket and the nose sprocket synchronously rotating; and step 5: switching, by the start-stop controller in the controller, to a stop mode, and controlling, by the start-stop controller, actions of the solenoid valves in the hydraulic valve group, where the hydraulic motor I and the hydraulic motor II continuously rotate because of inertia, so that an oil inlet side of a motor is evacuated, the oil inlet side is supplemented with oil through an oil supplement valve group, at the same time, hydraulic oil on oil return port sides of the hydraulic motor I and the hydraulic motor II flows into the accumulator and an oil tank, and pressure of the accumulator increases as stored oil increases, to form specific back pressure, to prevent the hydraulic motor I and the hydraulic motor II from continuously rotating, and speed up the hydraulic motors to stop rotating.

Beneficial effects of the present invention are as follows:

1) In the present invention, a nose hydraulic motor I and a tail hydraulic motor II are respectively driven by hydraulic drive systems, and an accumulator and an oil supplement valve group are disposed in a hydraulic system, to implement rapid starting and energy-saving braking of a high-power scraper conveyor in a heavy load state.

2) While a tail sprocket performs power compensation for a nose sprocket, a drive system of a scraper conveyor can keep, through synchronization between the nose hydraulic motor I and the tail hydraulic motor II in a speed synchronization controller, a stable operating speed of the scraper convey when facing random coal falling or a sudden load change.

3) Because the scraper conveyor runs for a long time, tension of a chain is likely to be insufficient, resulting in problems such as jamming and disconnection of the chain. When a chain tension monitoring sensor detects that a chain tension value is lower than a preset minimum value, a real-time controller switches to a tension coordination controller, to control a swash plate inclination angle of the tail hydraulic motor II to increase, to actuate the tail sprocket to speed down until the tension reaches a rated value, and then, the real-time switching controller switches to a speed synchronization controller, to keep synchronization between the tail sprocket and the nose sprocket, thereby adjusting chain tension at any time without downtime.

DETAILED DESCRIPTION OF THE INVENTION

The technical solutions in the present invention are described below in detail with reference to the accompanying drawings and specific embodiments.

Figure 1:
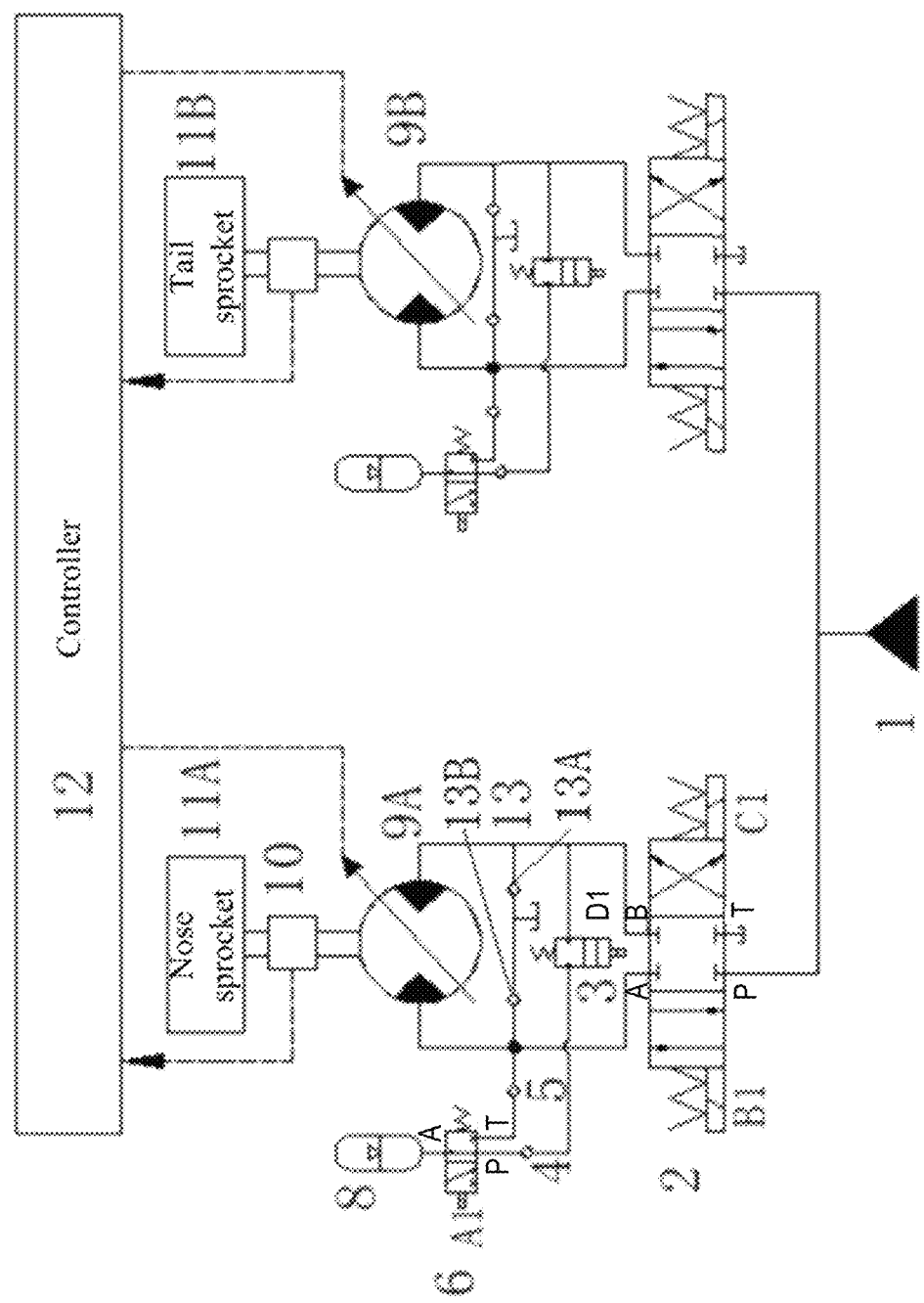
FIG. 1 is a schematic diagram of a principle of a hydraulic system according to the present invention.
Figure 2:
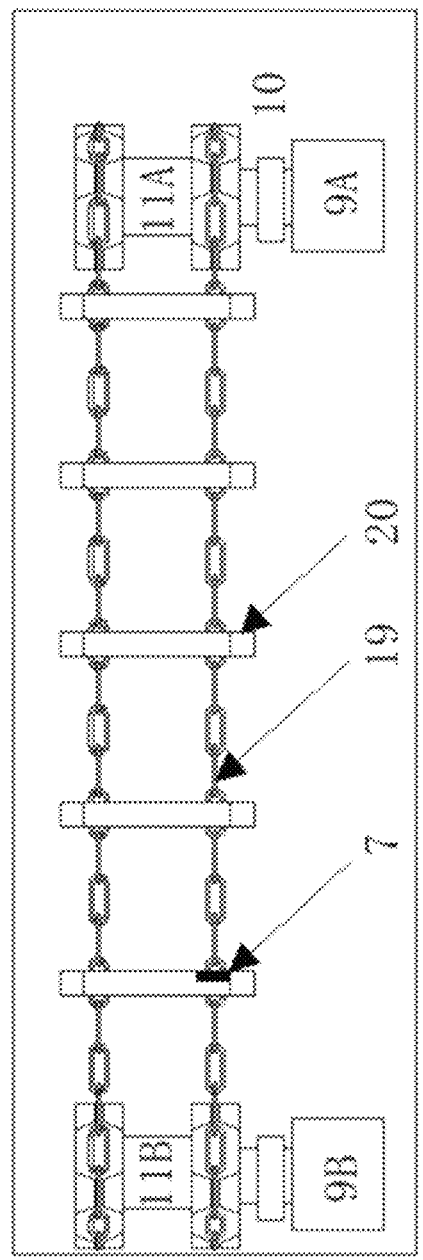
FIG. 2 is a schematic diagram of a scraper conveyor.

As shown in FIG. 1 and FIG. 2, a drive system of a scraper conveyor and a control method are provided, including a nose sprocket 11A, a tail sprocket 11B, a nose sprocket drive mechanism, and a tail sprocket drive mechanism, where the nose sprocket drive mechanism is a hydraulic motor I 9A, and the tail sprocket drive mechanism is a hydraulic motor II 9B; and a hydraulic system that drives the hydraulic motor I and a hydraulic system that drives the hydraulic motor II include same hydraulic elements.

Using the hydraulic system that drives the hydraulic motor I as an example, the hydraulic system includes: a three-position four-way solenoid directional valve 2, a two-position two-way solenoid directional valve 3, a two-position three-way solenoid directional valve 6, an accumulator 8, and an oil supplement valve group 13; an oil inlet P of the three-position four-way solenoid directional valve 3 is in communication with a hydraulic oil source 1, a first actuator port A of the three-position four-way solenoid directional valve 2 is in communication with an oil inlet of the hydraulic motor I 9A, a second actuator port B of the three-position four-way solenoid directional valve 2 is in communication with an oil inlet of the two-position two-way solenoid directional valve 3 and an oil return port of the hydraulic motor I 9A separately, an oil outlet of the two-position two-way solenoid directional valve 3 is in communication with a P-port of the two-position three-way solenoid directional valve 6 through an one-way valve I, an A-port of the two-position three-way solenoid directional valve 6 is connected to the accumulator 8, a T-port of the two-position three-way solenoid directional valve 6 is in communication with the oil inlet of the hydraulic motor I 9A through an one-way valve II 5, and the oil supplement valve group 13 is connected to an oil circuit between the oil inlet and the oil return port of the hydraulic motor I 9A in parallel.

When an electromagnet A1 of the two-position three-way solenoid valve 6 is energized, an electromagnet D1 of the two-position two-way solenoid valve 3 is de-energized, and a solenoid valve B1 of the three-position four-way reversing valve 2 is energized. Hydraulic oil enters the hydraulic motor I 9A through the three-position four-way reversing valve 2, to gradually drive the hydraulic motor I 9A to rotate to a rated rotational speed. In a starting process, the accumulator 8 simultaneously makes stored high-pressure oil pass through the two-position three-way solenoid valve 6 and the one-way valve II 5 sequentially to enter the hydraulic motor I 9A, thereby achieving rapid starting of the hydraulic motor I 9A. During stopping, the three-position four-way reversing valve 2 is de-energized and is in a neutral position, the electromagnet D1 of the two-position two-way solenoid directional valve 3 is energized, and the two-position three-way solenoid directional valve 6 is de-energized. The hydraulic motor I 9A continuously rotates because of inertia, causing an oil inlet side of the hydraulic motor I 9A to form an evacuated state. The oil inlet side is supplemented with oil through the oil supplement valve group 13. Oil on an oil return side of the hydraulic motor 9 sequentially passes through the two-position two-way solenoid valve 3, the one-way valve I 4, and the two-position three-way solenoid valve 6, to enter the accumulator 8. Pressure of the accumulator 8 increases as stored oil increases, to form specific back pressure, to prevent the hydraulic motor I 9A from continuously rotating, and absorb energy in a braking process of the hydraulic motor into the accumulator 8 for energy storage.

The hydraulic motor I 9A and the hydraulic motor II 9B are both servo-variable hydraulic motors. The drive system of a scraper conveyor provided in this embodiment further includes a controller 12, where the controller 12 includes a start-stop controller 18, and the start-stop controller 18 controls starting and stopping of the hydraulic motor I 9A and the hydraulic motor II 9B by controlling actions of hydraulic elements in a hydraulic valve group 14.

Specifically, the oil supplement valve group 13 includes two one-way valves connected in series, an oil outlet of an one-way valve III 13A is in communication with the oil return port of the hydraulic motor I 9A, an oil inlet of the one-way valve III 13A is in communication with an oil tank, an oil inlet of an one-way valve IV 13B is in communication with the oil tank, and an oil outlet of the one-way valve IV 13B is in communication with the oil inlet of the hydraulic motor I 9A.

The controller 12 includes a speed synchronization controller 16, rotational speed torque sensors 10 disposed respectively between the hydraulic motor I 9A and the nose sprocket 11A and between the hydraulic motor II 9B and the tail sprocket 11B, and the speed synchronization controller 16 controls, according to rotational speed signals of the rotational speed torque sensors 10, the nose sprocket 11A and the tail sprocket 11B to synchronously rotate, thereby resolving a power imbalance problem in the drive system of a scraper conveyor.

The controller 12 further includes a tension coordination controller 17, a chain tension monitoring sensor 7 is disposed on a scraper 20 of the scraper conveyor, and the tension coordination controller 17 controls and adjusts tension of a chain 19 according to chain tension detected by the chain tension monitoring sensor 7.

Figure 3:
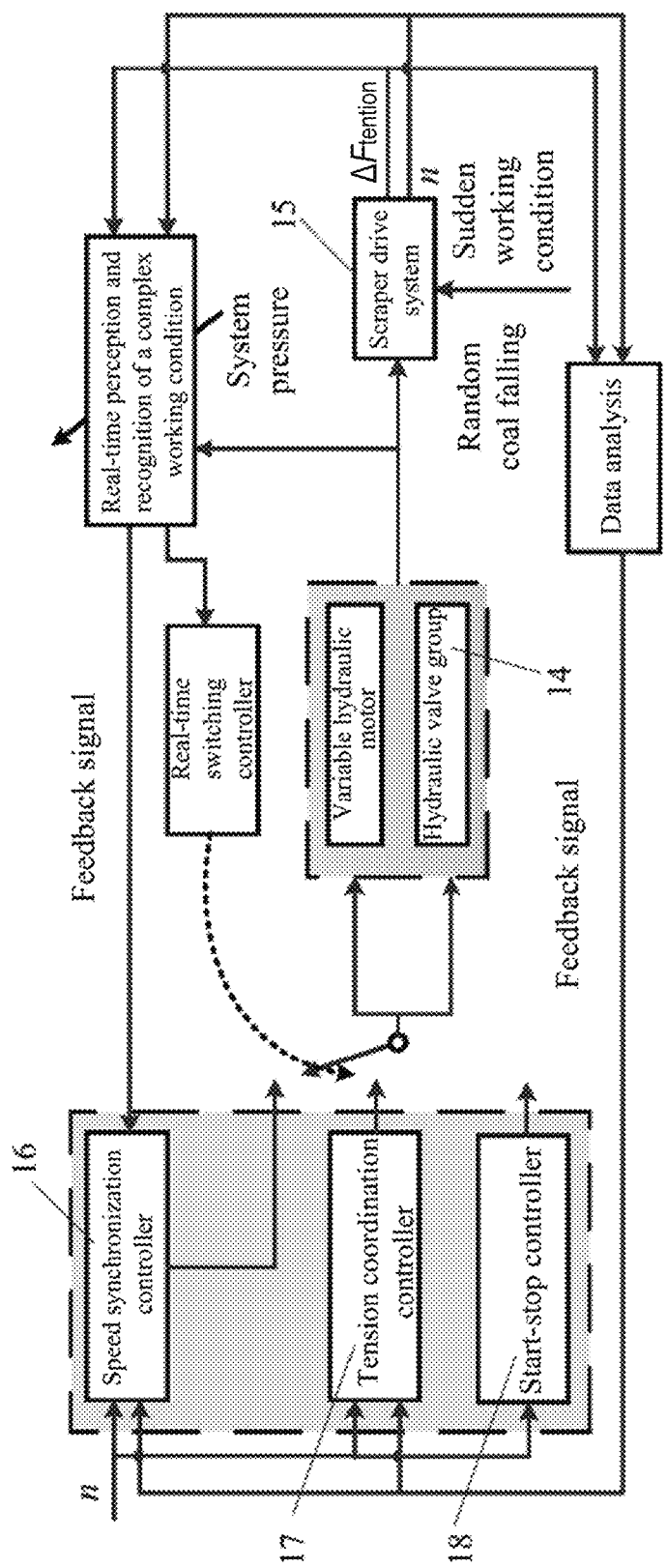
FIG. 3 is a schematic diagram of a control policy of a drive system of a scraper conveyor.
Figure 4:
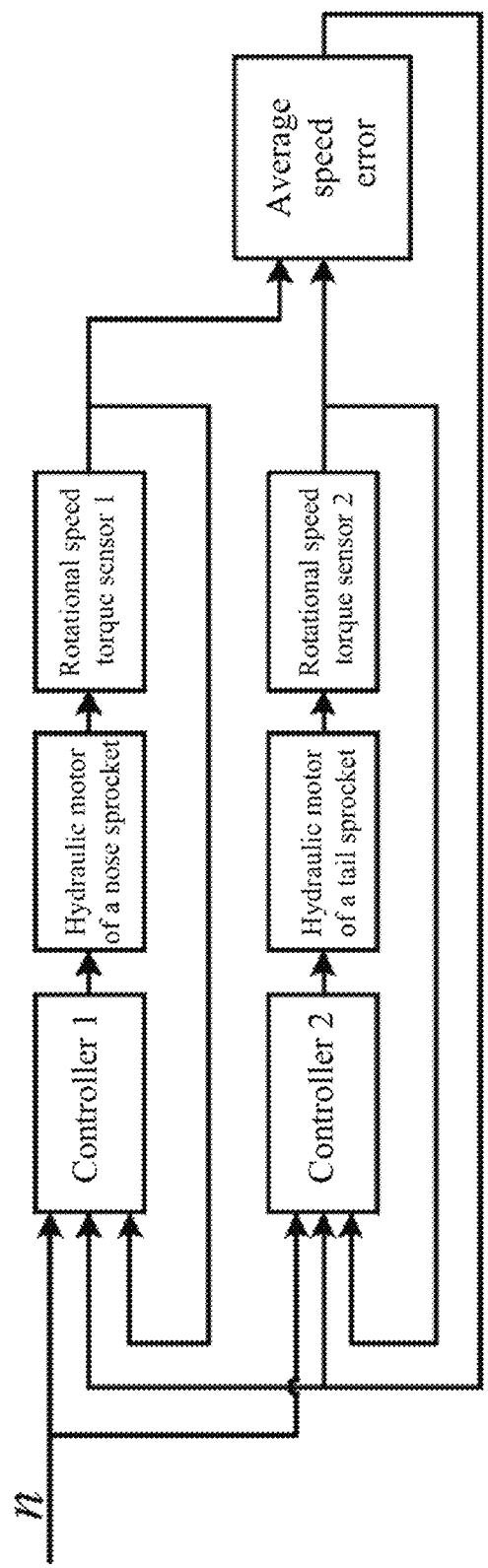
FIG. 4 is a schematic diagram of a control policy of a speed synchronization controller of a scraper conveyor.

As shown in FIG. 3 and FIG. 4, a control method for a drive system of a scraper conveyor is provided, including the following steps:

step 1: switching, by a start-stop controller 18 in a controller 12, to a start mode, and controlling, by the start-stop controller 18, actions of solenoid valves in a hydraulic valve group 14, to supply hydraulic oil in a hydraulic oil source and high-pressure oil stored in an accumulator 8 to a hydraulic motor I 9A and a hydraulic motor II 9B at the same time, and gradually reduce swash plate inclination angles of the hydraulic motor I 9A and the hydraulic motor II 9B from the maximum until the scraper conveyor reaches a rated operating rotational speed;

step 2: in a coal conveying process of the scraper conveyor, sending, by rotational speed torque sensors 10, real-time rotational speeds and average rotational speeds of the hydraulic motor I 9A and the hydraulic motor II 9B respectively to a speed synchronization controller 16, and controlling, by the synchronization controller 16, the swash plate inclination angles of the hydraulic motor I 9A and the hydraulic motor II 9B respectively according to a preset relative error value and an expected rotational speed value, to keep a tail sprocket 11B and a nose sprocket 11A synchronously rotating, to maintain a stable operating speed of the scraper conveyor;

step 3: when a chain tension monitoring sensor 7 detects that chain tension is lower than a preset minimum tension value, switching, by the controller 12, to a tension coordination controller 17 in real time, controlling, by the tension coordination controller 17, the swash plate inclination angle of the hydraulic motor II 9B at a tail to increase, to reduce a rotational speed of the tail sprocket 11B and keep a rotational speed of the nose sprocket 11A unchanged, thereby gradually increasing the chain tension until the chain tension falls within a preset value range, and switching, by the controller 12, to the synchronization controller 16 in real time, to keep the tail sprocket 11B and the nose sprocket 11A synchronously rotating;

step 4: when the chain tension monitoring sensor 7 detects that the chain tension is higher than a preset maximum tension value, switching, by the controller 12, to the tension coordination controller 17 in real time, controlling, by the tension coordination controller 17, the swash plate inclination angle of the hydraulic motor II 9B at the tail to decrease, to increase the rotational speed of the tail sprocket 11B and keep the rotational speed of the nose sprocket 11A unchanged, thereby gradually reducing the chain tension until the chain tension falls within the preset value range, and switching, by the controller 12, to the synchronization controller 16 in real time, to keep the tail sprocket 11B and the nose sprocket 11A synchronously rotating; and step 5: switching, by the start-stop controller 18 in the controller 12, to a stop mode, and controlling, by the start-stop controller 18, actions of the solenoid valves in the hydraulic valve group 14, where the hydraulic motor I 9A and the hydraulic motor II 9B continuously rotate because of inertia, so that an oil inlet side of a motor is evacuated, the oil inlet side is supplemented with oil through an oil supplement valve group 13, at the same time, hydraulic oil on oil return port sides of the hydraulic motor I 9A and the hydraulic motor II 9B flows into the accumulator 8 and an oil tank, and pressure of the accumulator 8 increases as stored oil increases, to form specific back pressure, to prevent the hydraulic motor I 9A and the hydraulic motor II 9B from continuously rotating, and speed up the hydraulic motors to stop rotating.

In this embodiment, a nose hydraulic motor I 9A and a tail hydraulic motor II 9B are respectively driven by hydraulic drive systems, and an accumulator 8 and an oil supplement valve group 13 are disposed in a hydraulic system, to implement rapid starting and energy-saving braking of a high-power scraper conveyor in a heavy load state. While a tail sprocket 11B performs power compensation for a nose sprocket 11A, a drive system 15 of a scraper conveyor can keep, through synchronization between the nose hydraulic motor I 9A and the tail hydraulic motor II 9B in a speed synchronization controller 16, a stable operating speed of the scraper convey when facing random coal falling or a sudden load change. Because the scraper conveyor runs for a long time, tension of a chain 19 is likely to be insufficient, resulting in problems such as jamming and disconnection of the chain. When a chain tension monitoring sensor 7 detects that a chain tension value is lower than a preset minimum value, a real-time controller switches to a tension coordination controller 17, to control a swash plate inclination angle of the tail hydraulic motor II 9B to increase, to actuate the tail sprocket 11B to speed down until the tension reaches a rated value, and then, the real-time switching controller switches to a speed synchronization controller 16, to keep synchronization between the tail sprocket and the nose sprocket, thereby adjusting chain tension at any time without downtime.

What is claimed is:

1. A drive system of a scraper conveyor, comprising a nose sprocket, a tail sprocket, a nose sprocket drive mechanism, and a tail sprocket drive mechanism, wherein the nose sprocket drive mechanism is a hydraulic motor I, and the tail sprocket drive mechanism is a hydraulic motor II; and a hydraulic system that drives the hydraulic motor I and a hydraulic system that drives the hydraulic motor II comprise same hydraulic elements;

the hydraulic system that drives the hydraulic motor I and the hydraulic system that drives the hydraulic motor II both comprise: a three-position four-way solenoid directional valve, a two-position two-way solenoid directional valve, a two-position three-way solenoid directional valve, an accumulator, and an oil supplement valve group; and an oil inlet P of the three-position four-way solenoid directional valve is in communication with a hydraulic oil source, a first actuator port A of the three-position four-way solenoid directional valve is in communication with an oil inlet of the hydraulic motor I, a second actuator port B of the three-position four-way solenoid directional valve is in communication with an oil inlet of the two-position two-way solenoid directional valve and an oil return port of the hydraulic motor I respectively, an oil outlet of the two-position two-way solenoid directional valve is in communication with a P-port of the two-position three-way solenoid directional valve through an one-way valve I, an A-port of the two-position three-way solenoid directional valve is connected to the accumulator, a T-port of the two-position three-way solenoid directional valve is in communication with the oil inlet of the hydraulic motor I through an one-way valve II, and the oil supplement valve group is connected to an oil circuit between the oil inlet and the oil return port of the hydraulic motor I in parallel.

2. The drive system of the scraper conveyor according to claim 1, wherein the hydraulic motor I and the hydraulic motor II are both servo-variable hydraulic motors; and the drive system further comprises a controller, wherein the controller comprises a start-stop controller, and the start-stop controller controls starting and stopping of the hydraulic motor I and the hydraulic motor II by controlling actions of hydraulic elements in a hydraulic valve group.

3. The drive system of the scraper conveyor according to claim 1, wherein the oil supplement valve group comprises two one-way valves connected in series, an oil outlet of an one-way valve III is connected to the oil return port of the hydraulic motor I, an oil inlet of the one-way valve III is in communication with an oil tank, an oil inlet of an one-way valve IV is in communication with the oil tank, and an oil outlet of the one-way valve IV is in communication with the oil inlet of the hydraulic motor I.

4. The drive system of the scraper conveyor according to claim 1, wherein the controller comprises a speed synchronization controller, rotational speed torque sensors disposed respectively between the hydraulic motor I and the nose sprocket and between the hydraulic motor II and the tail sprocket, and the speed synchronization controller controls, according to rotational speed signals of the rotational speed torque sensors, the nose sprocket and the tail sprocket to synchronously rotate.

5. The drive system of the scraper conveyor according to claim 4, wherein the controller further comprises a tension coordination controller, a chain tension monitoring sensor is disposed on a scraper of the scraper conveyor, and the tension coordination controller controls and adjusts tension of a chain according to chain tension detected by the chain tension monitoring sensor.

6. A control method for a drive system of a scraper conveyor, comprising the following steps:
  step 1: switching, by a start-stop controller in a controller, to a start mode, and controlling, by the start-stop controller, actions of solenoid valves in a hydraulic valve group, to supply hydraulic oil in a hydraulic oil source and high-pressure oil stored in an accumulator to a hydraulic motor I and a hydraulic motor II at the same time, and gradually reduce swash plate inclination angles of the hydraulic motor I and the hydraulic motor II from the maximum until the scraper conveyor reaches a rated operating rotational speed;
  step 2: in a coal conveying process of the scraper conveyor, sending, by rotational speed torque sensors, real-time rotational speeds and average rotational speeds of the hydraulic motor I and the hydraulic motor II respectively to a speed synchronization controller, and controlling, by the synchronization controller, the swash plate inclination angles of the hydraulic motor I and the hydraulic motor II respectively according to a preset relative error value and an expected rotational speed value, to keep a tail sprocket and a nose sprocket synchronously rotating, to maintain a stable operating speed of the scraper conveyor;
  step 3: when a chain tension monitoring sensor detects that chain tension is lower than a preset minimum tension value, switching, by the controller, to a tension coordination controller in real time, controlling, by the tension coordination controller, the swash plate inclination angle of the hydraulic motor II at a tail to increase, to reduce a rotational speed of the tail sprocket and keep a rotational speed of the nose sprocket unchanged, thereby gradually increasing the chain tension until the chain tension falls within a preset value range, and switching, by the controller, to the synchronization controller in real time, to keep the tail sprocket and the nose sprocket synchronously rotating;
  step 4: when the chain tension monitoring sensor detects that the chain tension is higher than a preset maximum tension value, switching, by the controller, to the tension coordination controller in real time, controlling, by the tension coordination controller, the swash plate inclination angle of the hydraulic motor II at the tail to decrease, to increase the rotational speed of the tail sprocket and keep the rotational speed of the nose sprocket unchanged, thereby gradually reducing the chain tension until the chain tension falls within the preset value range, and switching, by the controller, to the synchronization controller in real time, to keep the tail sprocket and the nose sprocket synchronously rotating; and step 5: switching, by the start-stop controller in the controller, to a stop mode, and controlling, by the start-stop controller, actions of the solenoid valves in the hydraulic valve group, wherein the hydraulic motor I and the hydraulic motor II continuously rotate because of inertia, so that an oil inlet side of a motor is evacuated, the oil inlet side is supplemented with oil through an oil supplement valve group, at the same time, hydraulic oil on oil return port sides of the hydraulic motor I and the hydraulic motor II flows into the accumulator and an oil tank, and pressure of the accumulator increases as stored oil increases, to form specific back pressure, to prevent the hydraulic motor I and the hydraulic motor II from continuously rotating, and speed up the hydraulic motors to stop rotating.

7. The drive system of the scraper conveyor according to claim 2, wherein the controller comprises a speed synchronization controller, rotational speed torque sensors disposed respectively between the hydraulic motor I and the nose sprocket and between the hydraulic motor II and the tail sprocket, and the speed synchronization controller controls, according to rotational speed signals of the rotational speed torque sensors, the nose sprocket and the tail sprocket to synchronously rotate.

8. The drive system of the scraper conveyor according to claim 3, wherein the controller comprises a speed synchronization controller, rotational speed torque sensors disposed respectively between the hydraulic motor I and the nose sprocket and between the hydraulic motor II and the tail sprocket, and the speed synchronization controller controls, according to rotational speed signals of the rotational speed torque sensors, the nose sprocket and the tail sprocket to synchronously rotate.

9. The drive system of the scraper conveyor according to claim 7, wherein the controller further comprises a tension coordination controller, a chain tension monitoring sensor is disposed on a scraper of the scraper conveyor, and the tension coordination controller controls and adjusts tension of a chain according to chain tension detected by the chain tension monitoring sensor.

10. The drive system of the scraper conveyor according to claim 8, wherein the controller further comprises a tension coordination controller, a chain tension monitoring sensor is disposed on a scraper of the scraper conveyor, and the tension coordination controller controls and adjusts tension of a chain according to chain tension detected by the chain tension monitoring sensor.

* * * * *